(12) United States Patent
Yang et al.

(10) Patent No.: US 8,092,143 B2
(45) Date of Patent: Jan. 10, 2012

(54) PNEUMATIC CARD TRANSPORT SYSTEM

(76) Inventors: Dai Qiang Yang, Beijing (CN); Feng He, Beijing (CN); Ke Wei Li, Hong Kong (CN)

( * ) Notice: Subject to any disclaimer, the term of this patent is extended or adjusted under 35 U.S.C. 154(b) by 324 days.

(21) Appl. No.: 12/478,742

(22) Filed: Jun. 4, 2009

(65) Prior Publication Data
US 2009/0274523 A1 Nov. 5, 2009

Related U.S. Application Data

(63) Continuation-in-part of application No. 11/468,308, filed on Aug. 30, 2006, now abandoned.

(51) Int. Cl.
*B65G 35/00* (2006.01)

(52) U.S. Cl. ............ 414/676; 406/4; 406/88; 271/195; 271/4.03

(58) Field of Classification Search ........... 271/195, 271/279, 4.03, 3.23; 406/4, 88; 414/676
See application file for complete search history.

(56) References Cited

U.S. PATENT DOCUMENTS

| | | | | |
|---|---|---|---|---|
| 3,993,358 A * | 11/1976 | Volat et al. | | 406/181 |
| 4,131,320 A * | 12/1978 | Volat et al. | | 406/88 |
| 4,530,632 A * | 7/1985 | Sela | | 414/788.9 |
| 4,915,547 A * | 4/1990 | Cahill et al. | | 406/87 |
| 5,234,211 A * | 8/1993 | Olexy | | 271/184 |
| 5,796,083 A * | 8/1998 | Kenneth et al. | | 235/380 |
| 5,828,043 A * | 10/1998 | Nicoll et al. | | 235/380 |
| 5,951,006 A * | 9/1999 | Biegelsen et al. | | 271/195 |
| 6,152,309 A * | 11/2000 | Price et al. | | 209/657 |
| 6,361,041 B2 * | 3/2002 | Stephan | | 271/195 |
| 6,595,518 B2 * | 7/2003 | Dobrindt | | 271/303 |
| 6,817,524 B2 * | 11/2004 | Hilton et al. | | 235/449 |
| 7,997,289 B1 * | 8/2011 | Frost et al. | | 134/137 |
| 2002/0074722 A1 * | 6/2002 | Dobrindt | | 271/303 |
| 2003/0052167 A1 * | 3/2003 | Hilton et al. | | 235/449 |

* cited by examiner

*Primary Examiner* — Joseph A Dillon, Jr.
(74) *Attorney, Agent, or Firm* — Eagle IP Limited; Jacqueline C. Lui

(57) ABSTRACT

A pneumatic card transport system is disclosed. The system is configured to use pressurized air to transport a card inserted to a conveying duct inside a card passageway assembly from a first end to a second end. Air nozzles are configured to release the pressurized airstreams at an angle relative to the conveying duct so that the card is essentially floating when traveling along the conveying duct. Hence, the card makes zero or minimum contact with the inner surface of the conveying duct. This will not only reduce the wear and tear of the card, but also reduces the traveling time inside the conveying duct.

14 Claims, 5 Drawing Sheets

PNEUMATIC CARD TRANSPORT SYSTEM

CROSS-REFERENCE TO RELATED APPLICATION

This application is a continuation-in-part of U.S. Ser. No. 11/468,308, filed on Aug. 30, 2006, which claims benefit of Chinese patent application Ser. No. 200510086678.7, filed on Oct. 21, 2005, both of which are hereby incorporated by reference herein in their entirety.

FIELD OF INVENTION

This invention relates a card or ticket transport system. In particular, the present invention relates to systems that use pneumatic means to transport the card or the ticket.

BACKGROUND OF INVENTION

Cards and tickets have been widely used in many industries for purposes such as identification and recording. For the purpose of the following discussion, we refer a card to a flat, thin piece of media generally made of paper, cardboard or plastic. Hence, a card as used herein not only refers to the credit card or smart card that conforms to the ISO-7816 standard, but also cards with different sizes and shapes, including paper cards that may generally be known to be used as ticket, boarding pass and post cards. For example, many public transport systems make use of a card processing machine to automatically release a barrier when a user presents a valid card. The card will first be transported to a reader inside the processing machine so that its content can be read and modified. Afterwards, it will either be returned back to the user, or redirected to a storage bin for future use. Hence an efficient and effective card transport system is required. Existing card transport systems use frictional means exerted from one or more rotating belts to carry the card from a card entrance point to its exit. As the belt makes physical contact to the card and relies on frictional force to drag it along, surface wear and tear on the card may develop; and the information stored onto it may be corrupted or erased.

SUMMARY OF INVENTION

In the light of the foregoing background, it is an object of the present invention to provide an alternate card transport system. The system makes use of pressurized air to push the card along a conveying duct so that it needs not make physical contact to the inner surface of the duct as it travels from the entrance to the exit.

Accordingly, the present invention, in one aspect, is a pneumatic card transport system comprising a card passageway assembly having a conveying duct with a first end and a second end to allow the transfer of a card therebetween. Near the first end, there are at least one main nozzle and at least one auxiliary nozzle attached to the card passageway assembly. The auxiliary nozzle and the main nozzle are fitted to the assembly on opposing sides. Each nozzle has an inlet to receive pressurized air and an outlet coupled to the conveying duct. Both the main and auxiliary nozzles are positioned to eject air from their respective outlets towards the second end of the conveying duct in a direction that forms a main nozzle obtuse angle, and an auxiliary nozzle obtuse angle relative to the longitudinal axis of the conveying duct. The auxiliary nozzle obtuse angle is reflective of the main nozzle obtuse angle. In addition, there is also at least one cushion nozzle attached to the bottom of the conveying duct. Each cushion nozzle also has a cushion inlet to receive pressurized air and a cushion outlet to eject air towards the second end at an angle that forms a cushion nozzle obtuse angle relative to the longitudinal axis of the conveying duct. The upper inner wall of the conveying duct above the at least one cushion nozzle is a continuous surface with no perforation. In operation, pressurized air from the main outlet exerts translational force on one side of the planar surface of the card and pressurized air from the auxiliary outlet exerts translational force on the opposite side of the planar surface of the card to cause the card to travel from the first end to the second end; and pressurized air from the cushion outlet exerts a translation force and an up-lifting force on the card to cause the card to float inside the conveying duct during the transfer when the system is in operation.

In a preferred embodiment of the present invention, the main nozzle obtuse angle, the auxiliary nozzle obtuse angle, and the cushion nozzle obtuse angle are in the range of 120 to 140 degrees.

In another embodiment, the system further comprises an electronic subsystem. This subsystem comprises (a) an electronic control unit comprising a micro-processor, memory that stores computer program and data, and a peripheral controller that receives sensor signals from a plurality of sensors and outputs at least one control signal; (b) a sensor near the first end that can detect the presence of a card inserted to the conveying duct; (c) an air-pressure splitter and regulator unit that is configured to receive pressurized air from a source and (d) a power supply unit to provide power to the system. The air-pressure splitter and regulator unit is coupled to at least one electromagnetic valve that can be switched on to allow pressurized air to pass through. In operation, the electronic control unit can execute the computer program that sends out a control signal to activate the electromagnetic valve when the sensor detects that a card has been inserted in the conveying duct. This allows pressurized air to flow onto the conveying duct via the nozzles. Moreover, the air-pressure splitter and regulator unit can be further configured to supply specific amounts of air flows and air pressures to the main nozzle, the auxiliary nozzle and the cushion nozzle respectively.

In yet another preferred embodiment, the system further comprises (a) a card separator assembly installed at the second end of the card passageway assembly; and (b) an electrical motor adapted to receive another control signal from the electronic control unit. The card separator assembly may further comprise (a) at least one card bin for receiving cards directed thereto; (b) a gear assembly that is coupled to the electrical motor; (c) a card-separating plate that is coupled to the gear assembly and capable of tilting at an angle, and (d) a second sensor fitted near the card separator assembly and configured to send another sensor signal to the electronic control unit when the card-separating plate is tilted to a predetermined angle.

In operation, the electronic control unit according to the preferred embodiment described above can execute the computer program to monitor the presence and position of the card as it travels along the conveying duct; and can activate the electrical motor to turn the card-separating plate to tilt at the pre-determined angle, thus directing the card separator assembly to deposit the card to an appropriate card bin.

According to another aspect of the present invention, a method of transporting a card from a first end to a second end of a conveying duct in a card passageway assembly by pneumatic means is disclosed. The method comprises the steps of injecting a main airstream and an auxiliary airstream from the first end into the conveying duct in the direction of the second end. The main airstream forms an obtuse angle so that the pressurized air blows onto one side of the planar surface of the card. The auxiliary airstream also forms an obtuse angle. This angle is reflective to the obtuse angle of the main airstream relative to the longitudinal axis of the conveying duct. In essence, the second airstream blows onto the opposing side of the planar surface of the card.

In a preferred embodiment, a third airstream can be injected from the bottom to the conveying duct in the direction of the second end. The direction of the airflow forms a third obtuse angle relative to the longitudinal axis of the conveying duct so that the third airstream provides an uplifting force on the card to cause the card to float inside the conveying duct as it travels therealong.

In yet another preferred embodiment, the method can further include steps of determining and controlling the air pressure and air flow of the first airstream, second airstream and third airstream.

There are many advantages to the present invention. Since the card is gliding and floating along the conveying duct as it travels from the first end to the second, it makes zero or minimum contacts with the inner surface of the conveying duct. Hence the wears and tears of the card and of the conveying duct surface are greatly reduced. It is therefore most suitable for cards that are reused frequently. This will improve the longevity of the card. As the number of moving parts in the entire system is reduced to minimum, the maintenance requirements can be greatly simplified. Hence card transport systems according to the present invention are highly suitable for situations that call for low operating cost and high environmental consciousness.

Another advantage of the present invention is that the card can travel at a higher speed as friction caused by physical contacts is reduced to minimum. As a result, the speed and efficiency of the present system are improved.

DETAILED DESCRIPTION OF THE PREFERRED EMBODIMENTS

The following description refers to the accompanying figures which form a part hereof and which also illustrate the embodiments of the present invention. It is understood that other embodiments can be made with structural and operational changes and they will still fall into the scope of the present invention.

As used herein and in the claims, "comprising", "having" and "including" means including the following elements but not excluding others; and "air" is preferably atmospheric air, but may also include any gas that has aerodynamic properties capable of operating a pneumatic system.

Figure 1:
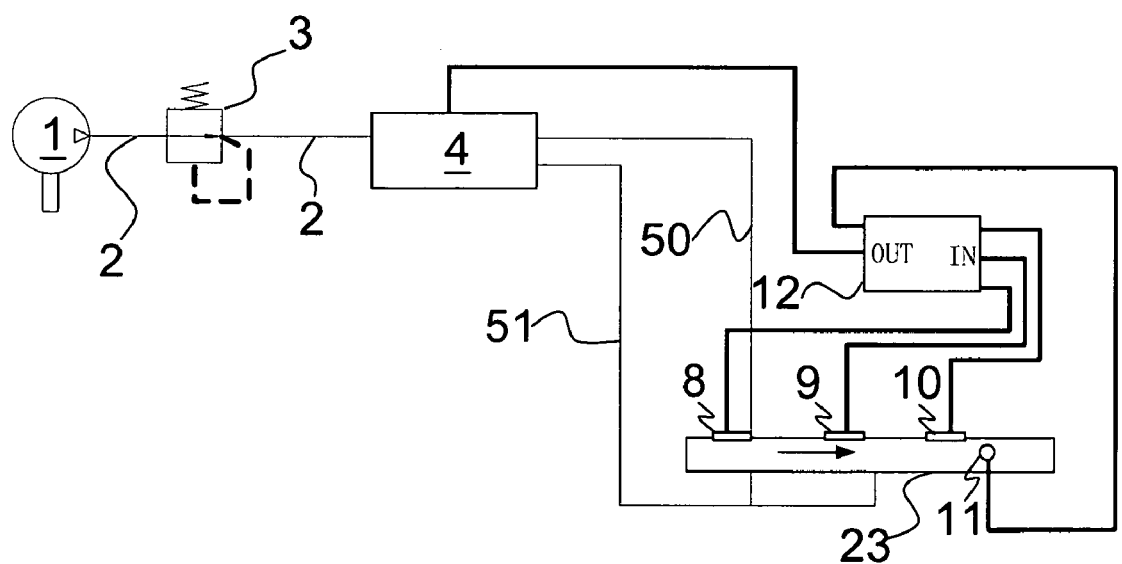
FIG. 1 is an overall architecture view of a pneumatic card transport system according to one embodiment the present invention.

Referring now to FIG. 1 an exemplary embodiment of the card transport system in the present invention comprises a card passageway assembly 23, a pneumatic subsystem that generates and distributes pressurized air, and an electronic control unit 12 that monitors and controls the overall system. The pneumatic subsystem comprises an air compressor 1, a main pressure regulation valve 3, an air-pressure splitter and regulator unit 4, multiple feel lines 2, 50 and 51, and multiple air intakes and nozzles that are not shown in FIG. 1. The air compressor 1 generates pressurized air that is fed to the main pressure regulation valve 3 via feed line 2. In this embodiment, the Siltenaire SIL-AIR module 30H air compressor from Italy is used. The air compressor 1 is adapted to adjust the air pressure to a pre-determined operating value. Typical value is 0.15 MPa (21.7 PSI). The air-pressure splitter and regulator unit 4 receives the pressurized air from the main pressure regulation valve 3, and splits it into two airstreams with pre-determined air pressures. One airstream is connected to the main air intake (not shown in FIG. 1) via feed line 50, and the other is connected to both the auxiliary air intake and cushion air intakes (both not shown in FIG. 1) via feed line 51. The detailed operation of which will be discussed later together with FIG. 5. The electronic control unit 12 comprises a microprocessor and peripheral controller that receives sensor inputs and output control signals. In the present embodiment, sensor inputs comprises the front sensor 8, the mid sensor 9 and the real sensor 10, and control signals are sent to drive a step motor 11 and activate the air-pressure splitter and regulator unit 4.

Figure 2:
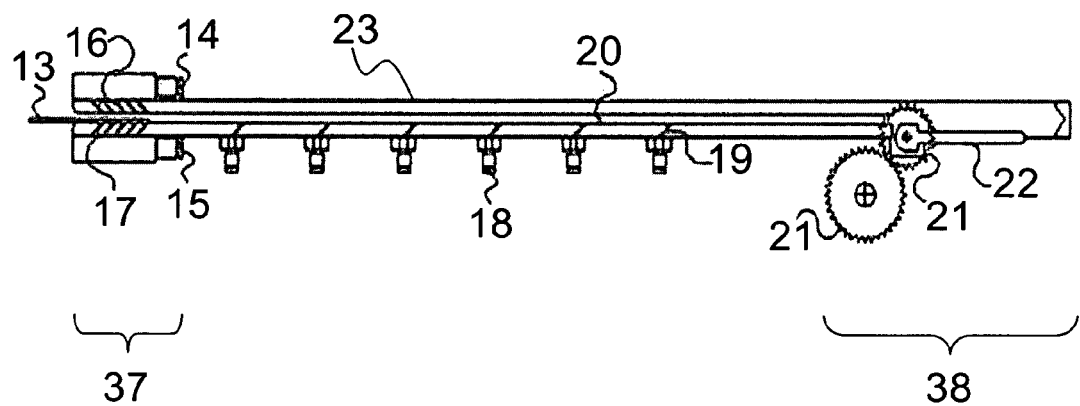
FIG. 2 is a cross section view of the card passageway assembly according to the same embodiment.
Figure 3:
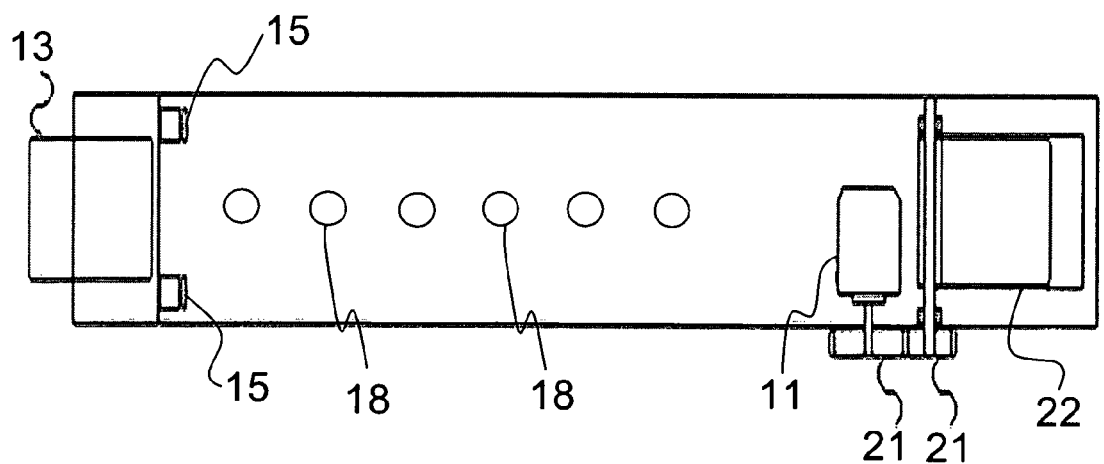
FIG. 3 is the bottom view of the card passageway assembly according to the same embodiment.

An exemplary card passageway assembly 23 is shown in FIG. 2. It comprises an elongated conveying duct 20 from which a card 13 can be inserted at a first end 37 and transported to a second end 38. In a specific embodiment, the cross-section of the conveying duct 20 is of a thin rectangular shape with its width and height large enough to accommodate the width and thickness respectively of the card that this card passageway assembly 23 is intended to transport. In the embodiment illustrated by the figures, the cross section of the card 13 showing its thickness is shown. At least one main nozzle 16 is attached near the first end 37 of the card passageway assembly 23. In this exemplary embodiment, four rows of five main nozzles are attached to the top side of the housing of the conveying duct. These main nozzles 16 receive pressurized air from the main air intake 14 and redirect it to the conveying duct 20. Similarly, at least one auxiliary nozzle 17 is also attached near the first end 37 of the card passageway assembly but at the oppose side of the main nozzle. In this embodiment, four rows of five auxiliary nozzles are attached to the bottom side of the housing of the conveying duct and they redirect pressurized air from the auxiliary air intake 15 to the conveying duct 20. There is also at least one cushion nozzle 19 attached to the bottom of the conveying duct in between the first end 37 and the second end 38. In this embodiment as shown in FIG. 2, four rows of six cushion nozzles are placed in even spacing along the bottom of the conveying duct. Each of them receives pressurized air from the air-cushion intake 18 and redirects it onto the conveying duct 20. Near the second end 38 is fitted a card separator assembly comprising a motor (not shown in FIG. 2), gear assembly 21 and a card-separating plate 22. FIG. 3 is the bottom view of the card passageway assembly 23. It further shows a step motor 11 that is fixed to the bottom of the card passageway assembly 23. In this embodiment, the step motor 11 is fitted with one of the gear of the gear assembly 21 so that when the step motor 11 turns, the gears in the gear assembly 21 also turns, causing the card-separating plate 22 to rotate. Hence by instructing the step motor 11 to turn, the card-separating plate will tilt accordingly.

Figure 4:
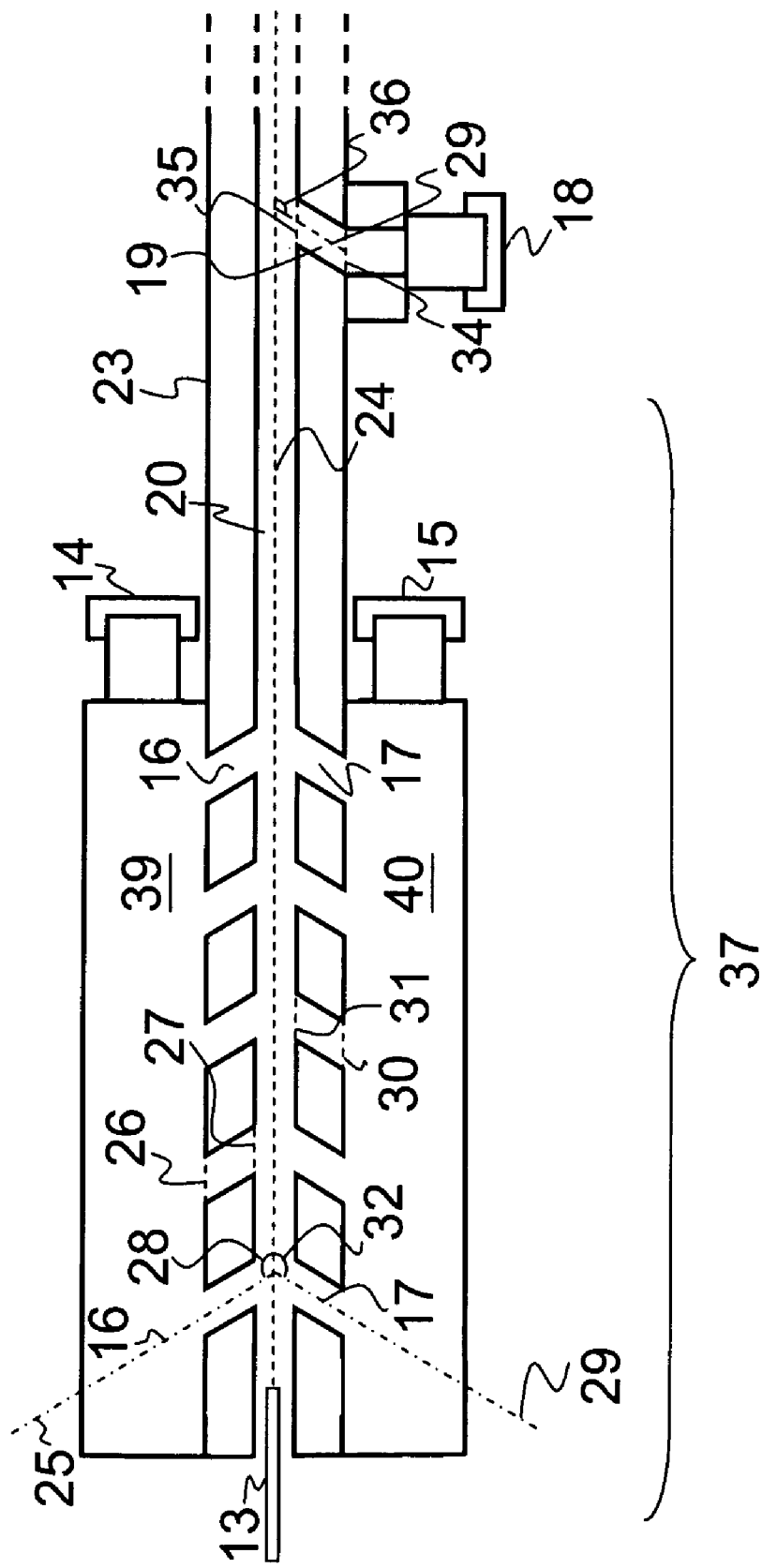
FIG. 4 is a diagrammatic representation of the first end of the card passageway assembly.

FIG. 4 further illustrates the detailed arrangements of different nozzles in relation to the conveying duct 20. Each main nozzle 16 comprises a main nozzle inlet 26 and a main nozzle outlet 27. All the main nozzle inlets 26 have openings coupled to a main chamber 39 and all the main nozzle outlets have openings coupled to the conveying duct 20. Pressurized air from the main air intake 14 first enters the main chamber 39, and then through the main nozzles, flows to the conveying duct 20. In this embodiment, the main nozzle axis 25 meets the conveying duct longitudinal axis 24 at an obtuse angle 28 so that pressurized air released from the main nozzle outlets 27 flows towards the second end 38 of the conveying duct 20. Similarly, the auxiliary nozzles 17 have their auxiliary nozzle inlets 30 coupled to an auxiliary chamber 40, and their auxiliary nozzle outlets 31 coupled to the conveying duct 20. The auxiliary nozzle axis 29 also meets the conveying duct longitudinal axis 24 at an obtuse angle 32 so that pressurized air from the auxiliary nozzle outlets 31 also flows towards the second end 38 of the conveying duct 20. Furthermore, the auxiliary nozzle obtuse angle 32 is reflective to the main nozzle obtuse angle 28 along the conveying duct longitudinal axis 24.

In a similar manner, the cushion nozzles 19 have their cushion nozzle inlet 34 coupled to the air-cushion intake 18, and their cushion nozzle outlet 35 coupled to the conveying duct 20. The cushion nozzle axis 29 also meets the conveying duct longitudinal axis 24 at an obtuse angle 36 so that pressurized air from the cushion nozzle outlets 35 also flows towards the second end 38 of the conveying duct 20.

Figure 5:
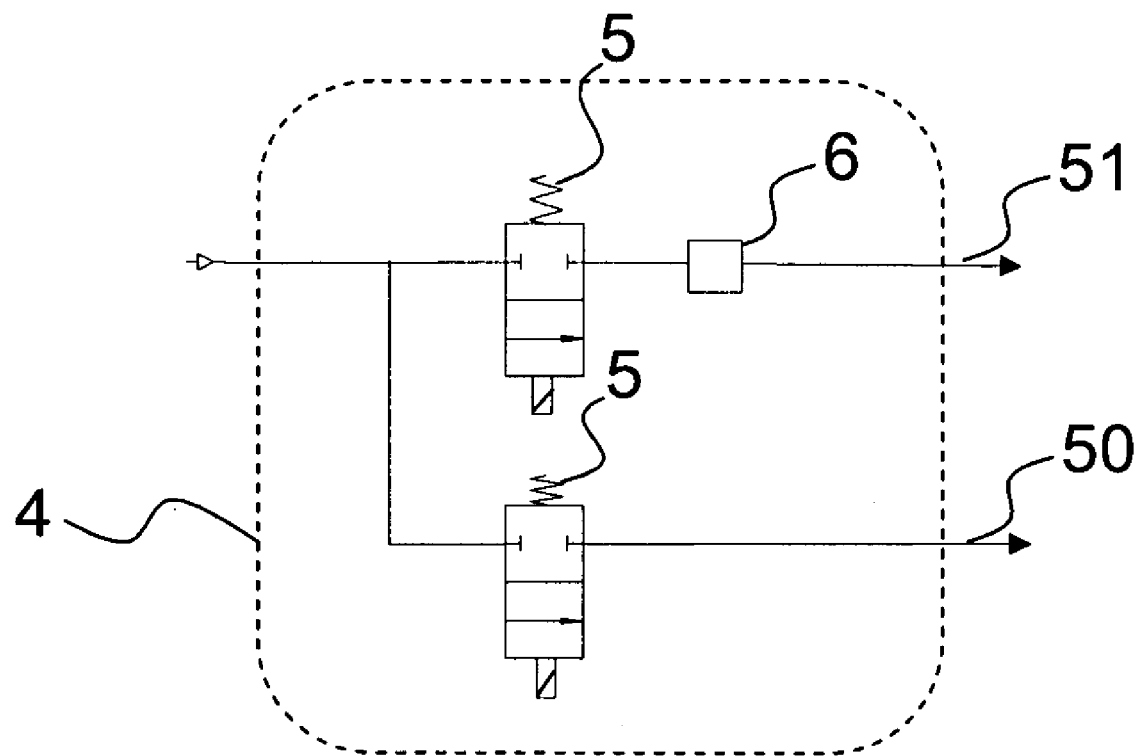
FIG. 5 is a diagram of the air pressure splitter and regulator unit in details.

Refer now to FIG. 5, the air-pressure splitter and regulator unit 4 in the present embodiment splits the main pressurized air from the main pressure regulation valve 3 to two different pathways. Each pathway is connected to an electromagnetic valve 5. Upon receiving a control signal from the electronic control unit 12, the electromagnetic valve 5 can change from a close to an open position, thus allowing the pressurized air to pass through. The output of one of the electromagnetic valve 5 is connected directly to feed line 50, which in turn connects to the main air intake 14 to supply pressurized air to the main nozzles. The output of the other electromagnetic valve 5 is coupled to an air pressure regulator 6 that reduces the air pressure by a specific amount and then connected to feed line 51 which supplies pressurized air to both the auxiliary nozzles 17 and the cushion nozzles 19.

Figure 6:
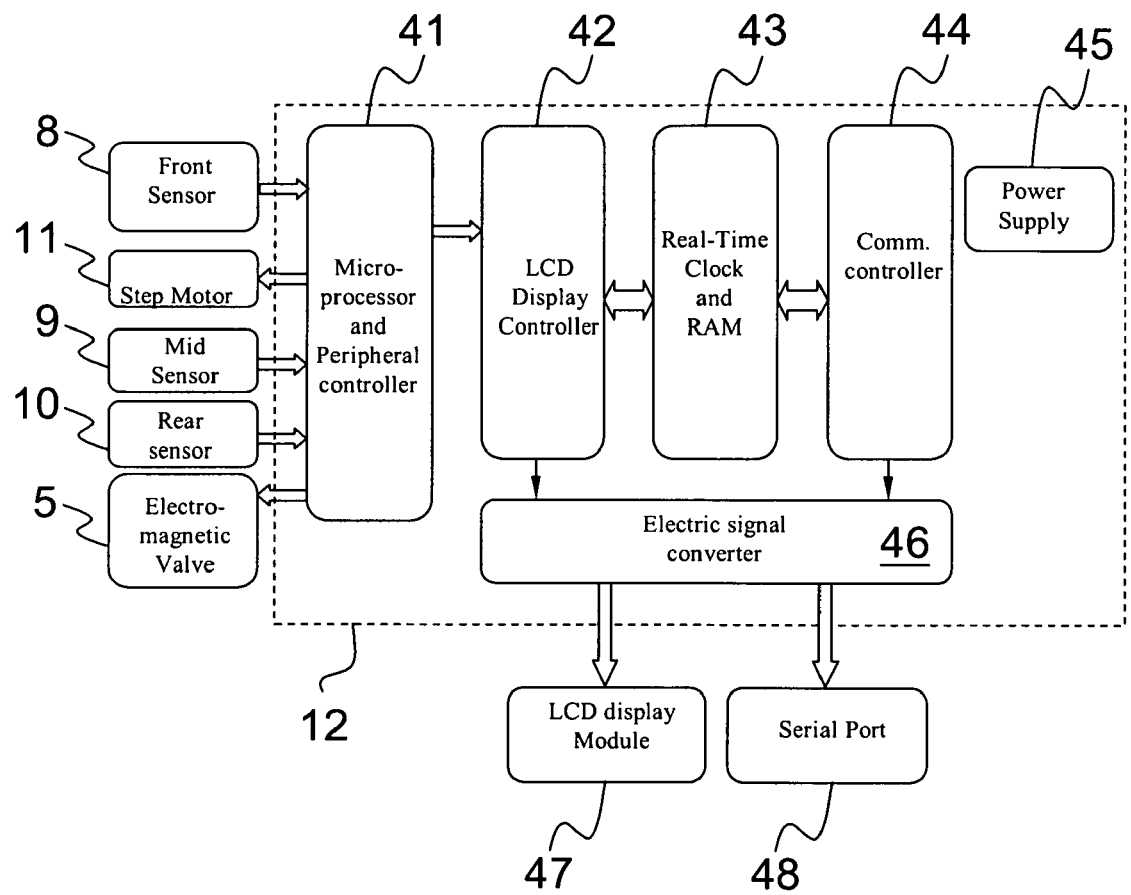
FIG. 6 is a detailed block diagram of the electronic control unit and the associated peripheral modules.

In the present embodiment, the electronic control unit 12 further comprises a microprocessor and peripheral controller 41, a LCD display controller 42, a real-time clock and RAM memory unit 43, a communication controller 44, a power supply unit 45 and an electric signal converter 46 as shown in FIG. 6. The electric signal converter 46 converts the electric signals from the LCD display controller 42 and the communication controller 44 to proper levels so that they can drive the external LCD display module 47 and the serial port 48. The serial port 48 may be used to connect to a host computer elsewhere. The micro-processor and peripheral controller 41 receives sensor inputs from the front sensor 8, the mid sensor 9, and the rear sensor 10. The front sensor 8 is fitted in the vicinity to the first end 37 of the card passageway assembly 23, while the mid sensor is fitted in the middle and the rear sensor fitted near the end of the card passageway assembly 23 respectively. All these sensors are adapted to detect the presence of a card 13 as it moves to the vicinity of these sensors along the conveying duct 20, and send electrical signals to alert the microprocessor and peripheral controller 41. Furthermore, the microprocessor and peripheral controller 41 sends out control signals to the step motor 11 and the electromagnetic valves 5 under program control.

In operation, the microprocessor and peripheral controller 41 executes a stored program, and monitors the sensor inputs. When a card 13 is inserted to the first end 37 of the card passageway assembly 23, the front sensor 8 detects its presence and alerts the electronic control unit 12. The later sends a control signal to open the electromagnetic valves 5, enabling pressurized air to flow through various air intakes 14, 15 and 18 and nozzles 16, 17 and 19 onto the conveying duct 20. The pressurized airstreams from the main nozzles 16 blow at an obtuse angle relative to the longitudinal axis 24 onto one side of the planar surface of the card, creating a shear force (or translation force) that pushes the card 13 forward, and a buoyancy force perpendicular to the longitudinal axis 24. Meanwhile, another airstreams from the auxiliary nozzles 17 blow onto the opposite planar surface of the card 13, at an obtuse angle that is reflective to the main nozzle obtuse angle 28 relative to the longitudinal axis 24. The airstreams from the auxiliary nozzles also exert a shear force (or translation force) and a buoyancy force onto the card 13. The combination of the shear forces and the buoyancy forces pushes the card 13 to glide along the conveying duct 20 from the first end 37 to the second end 38. Furthermore, the cushion nozzles 19 also eject a pressurized airstream from below at an obtuse angle relative to the longitudinal axis 24. It creates an air cushion and also re-enforces the translation motion of the card 13 as it travels along the conveying duct 20. Hence for the entire journey, the card makes zero or minimum contact with the inner surface of the conveying duct.

The amount of translational force that exerts onto the card 13 depends on the air pressures at the nozzles and also on the obtuse angles 28, 32 and 36. This angle is in the range of 120 to 140 degrees while the main nozzle obtuse angle and auxiliary nozzle obtuse angle are the same, the cushion nozzle obtuse angle can be different. In one specific implementation, the main nozzle obtuse angle, the auxiliary nozzle obtuse angle and the cushion nozzle obtuse angle are 40 degree. In a most preferred implementation, the main nozzle obtuse angle, the auxiliary nozzle obtuse angle and the cushion nozzle obtuse angle are 45 degree.

The air pressure for the main airstream is set to be slightly higher than that of the auxiliary airstream and the cushion airstream, and their values are adjusted according to the mass of the card 13. The heavier the card, the higher the air pressures needed. By way of example only, where the card has a mass of 5 grams, the air pressure at the main air intake 14 is set at 0.15 MPa; while the air pressures for both the auxiliary air intake and the air-cushion intakes are in the range of 0.06 to 0.07 MPa.

In a preferred implementation and referring back to FIG. 6, a single chip micro-controller AT89C51 from Atmel is used to realize the microprocessor and peripheral controller 41, the LCD display controller 42 and the communication controller 44. A DS12C887 chip from Maxim, Dallas is used for the real-time clock and RAM unit 43 and a MAX3223 chip from Texas Instrument for the electric signal converter 46. The front sensor 8 is adapted to detect the presence of the card 13 as it is inserted to the first end 37 of the conveying duct. The mid sensor 9 is to check whether the card moves along the conveying duct 20 smoothly; and the rear sensor 10 is to sense the position of the card-separating plate 22. In an even preferred embodiment, the stored program causes the microcontroller to activate the electromagnetic values 5 upon receiving a signal from the front sensor 8, enabling pressurized air to blow onto the conveying duct 20 to push the card towards the second end. It will also monitor the progress of the card 13 as it travels along the conveying duct 20. In a preferred embodiment, the electronic control unit 12 may instruct the step motor 11 to tilt the card-separating plate 22. As the later tilts to a pre-determined angle, it triggers the rear sensor 10 and a signal is sent to the micro-controller to stop the step motor from turning. When the card-separating plate is tilted, the card 13 traveling to the second end will then drop to a card bin placed below the card passageway assembly. This facilitates the collection of cards. With appropriate design of the stored program, the entire card transport system can also realize additional features such as initial status self-checking, obstacle alert and operation status display.

In an alternative embodiment, additional one or more card accessing devices can be attached to the card passageway assembly 23 to read the information from the card as it passes through the conveying duct 20. The type of card accessing devices adopted depends on the card. If the card is a paper-based ticket with characters, symbols, or bar code printed onto it, the corresponding card accessing device may be an optical scanner or a bar code reader. If the card has one or more magnetic strips, a corresponding magnetic strip reader is needed. If the card is a contactless smart card, then the card accessing device is a contactless reader. In a preferred embodiment for the magnetic strip card and contactless card, the same or an additional card accessing devices can be deployed to write new information onto the card. In another preferred embodiment, a plurality of card accessing devices can be deployed to both flat sides of the card passageway assembly 23 so that no matter which orientation the card is inserted to the card passageway assembly 23, the card information can be read and new information can be written into.

The card accessing devices may be electrically coupled to the electronic control unit 12 so that the latter can make use of the card information to determine its next course of action. An example is to output a control signal to the step motor 11 to tilt the card-separating plate to a specific angle so that the card will drop to an appropriate card bin. In addition, the electronic control unit 12 may also send new information to the card accessing device to write onto the card. This may be useful in an automatic fare collection (AFC) system whereby a certain amount of fare may be deducted from the card.

In yet another alternative embodiment, the air pressure regulator 6 may be an electrically-controllable regulator that can receive control signal from the electronic control unit 12. When the present invention is adapted to handle a wide variety of cards with different masses, the control unit 12 can be programmed to send different signal values to the electrically-controllable regulator to adjust the air pressures automatically; thus avoiding the tedious manual adjusting process. The suitable air pressure for a particular card mass may be tested and determined by one of ordinary skill in the art based on the teaching provided herein without undue experimentation.

The preferred embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, different numbers of main nozzles, auxiliary nozzles and cushion nozzles may be used for different implementations. While an elongated rectangular conveying duct is employed in the exemplary embodiment, other configurations having a cross-section view of oval, elliptical, rounded rectangular or hexagonal, or any other shapes may also be employed. Moreover, the conveying duct may also be a curved duct if it is advantageous to do so in some situations.

As mentioned in the background section, the card 13 referred here denotes a flat, thin piece of media and it may be a credit card, a credit card with at least one magnetic strip, a smart card, a contactless smart card, or a paper or plastic ticket, a boarding pass or a post card.

The front sensor 8, mid sensor 9 and rear sensor 10 can be any kind of sensing devices that can detect the presence of an object in its vicinity and output an electrical signal. It can be, but not limited to, a proximity sensor, an optical sensor, an infrared sensor, or a micro-switch. It is also obvious to those skilled in the art that the number of sensors can be increased or reduced.

Although step motor is mentioned in this description, other types of electrical motor can also be used and is also covered by this invention disclosure.

The detailed description discusses one exemplary implementation of the card separating module. It should not be construed as the only means to realize this module. In fact, this module can easily be extended by those skilled in the art to separate cards onto a plurality of card bins. While electro-mechanical means is described to control the card-separating plate, other means such as pneumatic control can also be used.

In this invention, the air pressures of the main airstream, auxiliary airstream and the cushion airstream need not be the same among themselves. In one embodiment, the air pressure for the main airstream is set to be slightly higher than that of the auxiliary airstream and the cushion airstream, and their values are adjusted according to the mass of the card. In another embodiment, the air pressure for the main airstream is lower than that of the auxiliary airstream and that of the cushion airstream.

In the exemplary embodiment as shown in FIG. 4, there is no counterpart of the cushion nozzles 19 at the upper inner wall of the conveying duct 20. In another word, the upper inner wall of the conveying duct 20 in the vicinity of the cushion nozzles 19 is a continuous surface without perforations or openings that correspond to the cushion nozzle outlets 35 which is located at the lower inner wall of the conveying duct 20. The card, when being cushioned and pushed by the cushion nozzles 19 towards the second end of the conveying duct, will thus only be supported by the air stream ejected from cushion nozzles 19.

What is claimed is:

1. A pneumatic card transport system comprising
   a) a card passageway assembly comprising a conveying duct with a first end and a second end to allow the transfer of a card therebetween;
   b) at least one main nozzle attached to said card passageway assembly proximate said first end; each said main nozzle having a main inlet to receive pressurized air and a main outlet coupled to said conveying duct; said main nozzle positioned to eject air from said outlet towards said second end in a direction that forms a first obtuse angle relative to the longitudinal axis of said conveying duct;
   c) at least one auxiliary nozzle attached to said card passageway assembly proximate said first end and opposite said at least one main nozzle; each said auxiliary nozzle having an auxiliary inlet to receive pressurized air and an auxiliary outlet coupled to said conveying duct; said auxiliary nozzle positioned to eject air from said auxiliary outlet towards said second end in a direction that forms a second obtuse angle relative to the longitudinal axis of said conveying duct; said second obtuse angle being reflective of said first obtuse angle; and
   d) at least one cushion nozzle attached to the bottom of said conveying duct; each said cushion nozzle having a cushion inlet to receive pressurized air and a cushion outlet to eject air towards said second end at an angle that forms a third obtuse angle relative to the longitudinal axis of said conveying duct; the upper inner wall of said conveying duct above said at least one cushion nozzle being a continuous surface with no perforation;

so that pressurized air from the main outlet exerts translational force on one side of the planar surface of said card and pressurized air from said auxiliary outlet exerts translational force on the opposite side of the planar surface of said card to cause said card to travel from said first end to said second end; and pressurized air from said cushion outlet exerts a translation force and an up-lifting force on said card to cause said card to float inside said conveying duct during said transfer when said system is in operation.

2. A system according to claim 1 further comprising the same number of main nozzles and auxiliary nozzles, with each said auxiliary nozzle positioned directly opposite a corresponding main nozzle to form pairs of nozzles, said pairs of nozzles being aligned longitudinally along said card passageway assembly.

3. A system according to claim 2 wherein said main nozzles are attached to the top side of said card passageway assembly and said auxiliary nozzles are attached to the bottom side of said card passageway assembly.

4. A system according to claim 1 wherein said conveying duct is a rectilinear duct.

5. A system according to claim 1 wherein said card is selected from a group consisting of:
  a. credit card;
  b. credit card with at least one magnetic strip;
  c. smart card;
  d. contactless smart card;
  e. paper ticket, and
  f. plastic ticket.

6. A system according to claim 1 further comprises an electronic subsystem; said electronic subsystem comprising:
  a) an electronic control unit comprising a microprocessor, memory that stores computer program and data; and a peripheral controller that receives sensor signals from a plurality of sensors and output at least one control signal;
  b) at least a first sensor provided proximate said first end; said first sensor adapted to send said sensor signal to said electronic control unit when said first sensor detects said card being inserted to said first end of said conveying duct;
  c) an air-pressure splitter and regulator unit configured to receive pressurized air from a source; said air-pressure splitter and regulator unit coupled to at least one electromagnetic valve; said at least one electromagnetic valve configured to receive a first control signal from said electronic control unit to control and supply said pressurized air to said at least one main nozzle, said at least one auxiliary nozzle and said at least one cushion nozzle, and
  d) a power-supply unit to provide power to said system
so that when said electronic subsystem is in operation, said electronic control unit can execute said computer program to activate said electromagnetic valve when said first sensor detects said card inserted to said conveying duct, allowing pressurized air to flow onto said conveying duct via said at least one main nozzle, said at least one auxiliary nozzle and said at least one cushion nozzle.

7. A system according to claim 6 wherein said plurality of sensors are:
  a) proximity sensors;
  b) optical sensors;
  c) infrared sensors;
  d) micro-switches, or
  e) any combination thereof.

8. A system according to claim 6 wherein said air-pressure splitter and regulator unit supplies
  a) a first amount of air flow with a predetermined air pressure to said at least one main nozzle;
  b) a second amount of air flow with a preset air pressure to said at least one auxiliary nozzle; and
  c) a third amount of air flow with a pre-selected air pressure to said at least one cushion nozzle.

9. A system according to claim 6, wherein the pressures of said pressurized air from said at least one main nozzle, said at least one auxiliary nozzle and said at least one cushion nozzle to said conveying duct are different from each other.

10. A system according to claim 6 further comprising:
  a) a card separator assembly comprising at least one card bin; said card separator assembly installed at said second end of said card passageway assembly for receiving cards directed thereto, and
  b) an electrical motor adapted to receive at least a second control signal from said electronic control unit;
so that said electronic control unit can execute said computer program to monitor the presence and position of said card as it travels along said conveying duct; and can activate said electrical motor to direct said card separator assembly to deposit said card to an appropriate card bin.

11. A system according to claim 10 wherein said card separator assembly further comprises:
  a) a gear assembly that is coupled to said electrical motor;
  b) a card-separating plate that is coupled to said gear assembly and capable of tilting at an angle, and
  c) a second sensor provided proximate said card separator assembly; said second sensor configured to send sensor signal to said electronic control unit when said card-separating plate is tilted to a pre-determined angle
so that said electronic control unit may send said second control signal to said electric motor to turn said card-separating plate to tilt at said pre-determined angle.

12. A system according to claim 10 further comprising at least one card accessing device that can read information from and write information to said card; said card accessing device coupled to said card passageway assembly and electrically connected to said electronic control unit so that when said card travels from a first end of said conveying duct to said second end, said card accessing device can read said information from said card to said electronic control unit.

13. A system according to claim 12 wherein said electronic control unit can also write information to said card via said at least one card accessing device.

14. A system according to claim 12 wherein upon reading said information from said card, said electronic control unit actuates said electrical motor causing said card-separating assembly to deposit said card to a specified card bin when it reaches said second end.

* * * * *